United States Patent
Sasaki et al.

(10) Patent No.: US 8,241,742 B2
(45) Date of Patent: Aug. 14, 2012

(54) COATED STEEL SHEET COMPRISING A COMPOSITE COAT CONTAINING COMPOUNDED RESIN PARTICLES

(75) Inventors: Motohiro Sasaki, Tokyo (JP); Junpei Karoji, Tokyo (JP); Koichi Saito, Tokyo (JP); Atsushi Morishita, Chiba (JP); Akira Takahashi, Chiba (JP); Hiroshi Kanai, Chiba (JP); Masahiro Fuda, Chiba (JP)

(73) Assignees: Nippon Steel Corporation, Tokyo (JP); Nippon Paint Co., Ltd., Osaka-shi (JP)

( * ) Notice: Subject to any disclaimer, the term of this patent is extended or adjusted under 35 U.S.C. 154(b) by 635 days.

(21) Appl. No.: 12/303,191

(22) PCT Filed: Jun. 15, 2006

(86) PCT No.: PCT/JP2006/312055
§ 371 (c)(1),
(2), (4) Date: Mar. 27, 2009

(87) PCT Pub. No.: WO2007/144951
PCT Pub. Date: Dec. 21, 2007

(65) Prior Publication Data
US 2010/0233469 A1    Sep. 16, 2010

(51) Int. Cl.
*B32B 5/16*  (2006.01)
*B32B 15/18*  (2006.01)
*B32B 15/095*  (2006.01)

(52) U.S. Cl. ........ 428/323; 428/327; 428/331; 428/332; 428/341

(58) Field of Classification Search .............. 428/323, 428/327, 341, 331, 332
See application file for complete search history.

(56) References Cited

U.S. PATENT DOCUMENTS

| 6,509,099 B1 * | 1/2003 | Urata et al. ............ 428/423.1 |
| 6,596,250 B2 * | 7/2003 | Greenwood et al. .......... 423/335 |
| 2005/0025991 A1 | 2/2005 | Ishizuka et al. |

FOREIGN PATENT DOCUMENTS

| JP | 10277481 A  * | 10/1998 |
| JP | 11-268178 A | 10/1999 |
| JP | 2001-164182 A | 6/2001 |
| JP | 2001-199003 A | 7/2001 |
| JP | 2001-214283 A | 8/2001 |
| JP | 2001-288582 A | 10/2001 |
| JP | 2001294630 A * | 10/2001 |
| JP | 2003-49281 A | 2/2003 |
| JP | 2003-105555 A | 4/2003 |
| JP | 2003-155451 A | 5/2003 |
| JP | 2005-018199 A | 1/2005 |
| JP | 2005-48199 A | 2/2005 |
| JP | 2005-199673 A | 7/2005 |
| JP | 2005-281863 A | 10/2005 |

OTHER PUBLICATIONS

Machinr Translation of JP 2003-155451.*
Machine Translation of JP 2001-294630.*
Machine Translation of JP 10-277481.*
Supplementary European Search Report dated Apr. 4, 2011, issued in corresponding European Patent Application No. 06757353.5.
International Search report of PCT/JP2006/312055, date of mailing Aug. 15, 2006.
Official Action dated Oct. 11, 2010, issued regarding corresponding Indonesian Patent Application No. W-00 200803985

* cited by examiner

*Primary Examiner* — Hoa (Holly) Le
*Assistant Examiner* — Alexandre Ferre
(74) *Attorney, Agent, or Firm* — Westerman, Hattori, Daniels & Adrian, LLP

(57) ABSTRACT

It is an object of the present invention to provide a coated steel sheet, properties of which such as tape peeling resistance, solvent resistance, alkali resistance and abrasion resistance are improved.

A coated steel sheet coated with a composite coat, wherein said composite coat comprises a compounded resin (A) in which polyurethane resin particles (A-1) and ethylene-unsaturated carboxylic acid copolymerization resin particles (A-2), respectively having an average particle diameter of 20 to 100 nm and a silanol group and/or an alkoxysilyl, group, are contained in a mass ratio of 20:80 to 90:10 and silicon oxide particles (A-3) having an average particle diameter of 5 to 20 nm and an organic titanium compound (A-4) are compounded, polyolefin wax particles (B) having an average particle diameter of 0.5 to 4 μm and a softening point of 100 to 140° C., and silicon oxide particles (C) having an average particle diameter of 70 to 200 nm, and wherein an amount of a coat of said composite coat is 0.5 to 3 g/cm$^2$.

7 Claims, No Drawings

COATED STEEL SHEET COMPRISING A COMPOSITE COAT CONTAINING COMPOUNDED RESIN PARTICLES

This application is the U.S. national phase of International Application No. PCT/JP2006/312055, filed Jun. 15, 2006, which designated the U.S., the entire contents of which are hereby incorporated by reference.

TECHNICAL FIELD

The present invention relates to a coated steel sheet.

BACKGROUND ART

Hitherto, to zinc-plated steel sheets, aluminum-plated steel sheets and the like, a rust prevention treatment by chromate, which uses hexavalent chromate, has been widely applied, and, as required, theses steel sheets have been coated with an organic resin or in addition to this, they have been top coated with various coating compositions in order to provide a higher degree of corrosion resistance, an anti-fingerprint property, an anti-scratch property and lubricity.

In recent years, there are moves to regulate or prohibit chromate treatments which hitherto have been applied to steel materials by a law against the background of increasing environmental issues. Since a chromate treated layer in itself has a high degree of corrosion resistance and an adhesion property to a paint, if this chromate treatment is not performed, it is expected that these properties are significantly deteriorated. Accordingly, it has been desired to form a rust preventing layer having good corrosion resistance and a good adhesion property to a paint by only a one-step treatment by an organic resin without carrying out a surface preparation by a chromate treatment.

In Japanese Kokai Publication 2001-164182, a rust prevention coating agent containing a water-borne resin composition obtained by reacting a composition containing a water-borne polyurethane resin, a water-borne polyolefin resin, water-dispersible silica and a silane coupling agent and/or a condensate of hydrolysate thereof, a thiocarbonyl group-containing compound and a phosphate ion, a rust prevention method of coating this rust prevention coating agent, and a metal material, to which rust prevention is applied, coated with the rust prevention coating agent are disclosed. However, in accordance with the above method, there are problems that since the reaction of the silane coupling agent with the respective resin is insufficient, a degree of compounding among the respective components in a coat to be formed is low and therefore solvent resistance and alkali resistance are low.

In Japanese Kokai Publication 2001-199003, a coated steel sheet having a composite coat containing two species of resins having different solubility parameters and inorganic components is described. However, because an inadequately crosslinked coat is formed, there is a problem of being suffered from large damage in a solvent rubbing test.

In Japanese Kokai Publication 2001-214283, a surface treated zinc-based plated steel sheet, which has a coat layer formed by applying a water-borne composition containing a metal compound, a water-soluble organic resin and acid onto the surface of a zinc-based plated steel sheet, is disclosed. However, because an amount of a carboxyl group in the water-soluble resin is relatively large, there is a problem that alkali resistance is poor.

In Japanese Kokai Publication 2003-49281, a coated steel sheet having an organic coat formed from an epoxy resin and a glycoluril resin on at least one side of a metal sheet is disclosed. However, there is a problem that because the formed organic coat does not contain a rust preventive agent, corrosion resistance is inadequate.

In Japanese Kokai Publication 2003-105555, a surface treated steel sheet, which has a surface treatment coat formed from a surface treatment composition containing (a) water-dispersible resin and/or a water-soluble resin, (b) a silane coupling agent, and (c) phosphoric acid and/or hexafluorometalic acid on the surface of a zinc-based plated steel sheet or an aluminum-based plated steel sheet, is disclosed. However, there is a problem that the stability of a treatment agent or the solvent resistance of a coat obtained is inadequate.

In Japanese Kokai Publication 2005-281863, a coated steel sheet, which is provided with a coating containing a crosslinked resin matrix and an inorganic rust preventive agent, is described. But, since in this coated steel sheet, all of performance such as corrosion resistance of a processed portion, tape peeling resistance, solvent resistance, alkali resistance and abrasion resistance are not necessarily satisfactory, a coated steel sheet in which these performance are improved is required.

In Japanese Kokai Publication 2001-288582, a surface treated metal sheet treated with a water-borne organic composite coating composition containing a water-borne resin, colloidal silica and a lubricant is described. However, since this invention is substantially predicated on using a chromate treatment as surface preparation, if only a coat composed of the organic composite coating composition is employed, only insufficient performance can be attained in the corrosion resistance or adhesion though satisfactory performance can be attained in the abrasion resistance. Accordingly, a coated steel sheet, performance of which is further improved, is required.

DISCLOSURE OF THE INVENTION

In view of the above-mentioned state of the art, it is an object of the present invention to provide a coated steel sheet, properties of which such as corrosion resistance of a processed portion, tape peeling resistance, solvent resistance, alkali resistance and abrasion resistance are improved. Herein, the tape peeling resistance represents peeling resistance of a composite coat, which is coated on the coated steel sheet, exhibited when a highly sticky tape is stuck to a coated steel sheet and it is peeled off from the coated steel sheet after being left standing for an arbitrary time period, and the abrasion resistance represents resistance to abrasion which can be produced by rubbing during transporting coils or processed goods of a steel sheet.

The present invention pertains to a coated steel sheet coated with a composite coat, wherein said composite coat comprises a compounded resin (A) in which polyurethane resin particles (A-1) and ethylene-unsaturated carboxylic acid copolymerization resin particles (A-2), respectively having an average particle diameter of 20 to 100 nm and a silanol group and/or an alkoxysilyl, group, are contained in a mass ratio of 20:80 to 90:10 and silicon oxide particles (A-3) having an average particle diameter of 5 to 20 nm and an organic titanium compound (A-4) are compounded, polyolefin wax particles (B) having an average particle diameter of 0.5 to 4 μm and a softening point of 100 to 140° C., and silicon oxide particles (C) having an average particle diameter of 70 to 200 nm, and wherein an amount of a coat of said composite coat is 0.5 to 3 g/m².

In the composite coat, it is preferred that an amount of the silicon oxide particle (A-3) is 5 to 100% by mass with respect to the total amount of the polyurethane resin particle (A-1) and the ethylene-unsaturated carboxylic acid copolymerization resin (A-2) and the content of a titanium atom is 0.05 to 3% by mass with respect to the total amount of the coat.

The composite coat is preferably a coat formed by further compounding at least one rust preventive agent (D) selected from the group consisting of phosphate compounds, thiocarbonyl compounds, niobium oxide and guanidine compounds in addition to the substances (A), (B) and (C).

It is preferred that the polyurethane resin particle (A-1) has a polycarbonate group and the ethylene-unsaturated carboxylic acid copolymerization resin (A-2) is a derivative from a neutralized product of an ethylene-methacrylic acid copolymerization resin with alkali metal, ammonia and/or amine.

Hereinafter, the present invention will be described in detail.

The coated steel sheet of the present invention is superior in corrosion resistance of a processed portion, tape peeling resistance, solvent resistance, alkali resistance and abrasion resistance and can be suitably used for applications such as household electrical appliances, office equipment, construction materials, and automobiles.

The above-mentioned coated steel sheet has a coat on the surface of a steel sheet, which comprises the compounded resin (A) in which the polyurethane resin particles (A-1) and the ethylene-unsaturated carboxylic acid copolymerization resin particles (A-2), respectively having an average particle diameter of 20 to 100 nm and a silanol group and/or an alkoxysilyl group, are contained in a mass ratio of 20:80 to 90:10 and further the silicon oxide particles (A-3) having an average particle diameter of 5 to 20 nm and the organic titanium compound (A-4) are compounded. That is, the coated steel sheet of the present invention is superior in the tape peeling resistance, the solvent resistance, and the alkali resistance since it has the coat comprising the compounded resin (A) formed by compounding the above substances (A-1) to (A-4).

Further, a property of abrasion resistance can be improved by containing the polyolefin wax particles (B) having an average particle diameter of 0.5 to 4 µm and a softening point of 100 to 140° C., and the silicon oxide particles (C) having an average particle diameter of 70 to 200 nm. That is, the coated steel sheet of the present invention is a coated steel sheet in which by combining the polyolefin wax particles (B) which is soft and has excellent lubricity with the silicon oxide particles (C) having a relatively large particle diameter and high hardness, a coefficient of kinetic friction and a coefficient of static friction of the surface of the coated steel sheet are adjusted and the abrasion resistance and the handling of the coated steel sheet are brought into balance.

The above-mentioned compounded resin (A) can be attained by the reaction of the above-mentioned resin particles (A-1) and (A-2), silicon oxide particle (A-3) and organic titanium compound (A-4). The above-mentioned reaction may be initiated in forming a coat on the surface of a metal plate, or a part of the reaction may be performed before forming a coat and the reaction may be completed at the time when a coat is formed. Further, the above-mentioned silicon oxide particle (C) can also be compounded as a component of the compounded resin (A) by reacting with the components of the above compounded resin (A) at the time when a coat is formed.

The above-mentioned resin particles (A-1) is not particularly limited as long as it is a polyurethane resin having an average particle diameter of 20 to 100 nm and a silanol group and/or an alkoxysilyl group but polycarbonate-based polyurethane is preferred in point of having excellent solvent resistance and alkali resistance. The above polycarbonate-based polyurethane resin particle can be obtained by producing polyurethane prepolymer by a reaction of an isocyanate group-containing compound with polycarbonate polyol, low molecular weight polyol and a compound having an active hydrogen group and a hydrophilic group, then neutralizing the above-mentioned hydrophilic group with a neutralizer, and dispersing this neutralized prepolymer in water including alkoxysilanes containing the active hydrogen group, and polyamine to extend the chain of the prepolymer.

Specific examples of the above isocyanate group-containing compound include aliphatic diisocyanates such as hexamethylene diisocyanate and the like, alicyclic diisocyanates such as 1,3-cyclohexane diisocyanate, isophorone diisocyanate, 4,4'-methylenebis(cyclohexyl isocyanate), methyl-2,4-cyclohexane diisocyanate, methyl-2,6-cyclohexane diisocyanate, 1,3-bis(isocyanatemethyl)cyclohexane and the like, aromatic diisocyanates such as m-phenylene diisocyanate, p-phenylene diisocyanate, 1,5-naphthalene diisocyanate, 4,4'-diphenylmethane diisocyanate, 2,4- or 2,6-tolylene diisocyanate or a mixture thereof, 4,4-toluidine diisocyanate and the like.

Specific examples of the above polycarbonate polyol include, for example, a compound obtained by reacting one or more species of glycols selected from the group consisting of ethylene glycol, propylene glycol, 1,3-propanediol, 1,4-butanediol, 1,5-pentanediol, 1,6-hexanediol, 3-methyl-1,5-pentanediol, neopentylglycol, diethyleneglycol, dipropylene glycol, 1,4-cyclohexanediol, 1,4-cyclohexanedimethanol, bisphenol A and hydrogenated bisphenol A with dimethyl carbonate, diphenyl carbonate, ethylene carbonate or phosgene.

Specific examples of the above low molecular weight polyol include, for example, glycols such as ethylene glycol, propylene glycol, 1,3-propanediol, 1,4-butanediol, 1,6-hexanediol, neopentyl glycol, diethylene glycol, dipropylene glycol, 1,4-cyclohexanediol and 1,4-cyclohexanedimethanol, and glycerin, trimethylolpropane, and pentaerythritol.

Specific examples of the above compound having the active hydrogen group and the hydrophilic group include sulfonic acid-containing compounds such as 2-hydroxyethanesulfonic acid or derivatives thereof, and carboxyl group-containing compounds such as 2,2-dimethylolpropionic acid and 2,2-dimethylolbutyric acid or derivatives thereof. When the above-mentioned polyurethane resin particle is produced, these compounds are used alone or in combination of two or more species thereof.

The hydrophilic groups such as a carboxyl group or a sulfonic acid group were neutralized with a neutralizer in advance in order to disperse the polyurethane prepolymer well in water.

Specific examples of the above-mentioned neutralizer include ammonia or triethylamine, tertiary amines such as dimethylethanolamine and the like, and hydroxides of alkali metal such as sodium hydroxide, potassium hydroxide and the like. These compounds may be used alone or in combination of two or more species thereof.

Specific examples of the above alkoxysilanes containing the active hydrogen group include amino group-containing silanes such as γ-(2-aminoethyl)aminopropyltrimethoxysilane, γ-(2-aminoethyl)aminopropyltriethoxysilane, γ-(2-aminoethyl)aminopropylmethyldimethoxysilane, γ-(2-aminoethyl)aminopropylmethyldiethoxysilane, γ-aminopropyltrimethoxysilane and γ-aminopropyltriethoxysilane, and mercapto group-containing silanes such as γ-mercaptopropyltrimethoxysilane, γ-mercaptopropylmethyldimethoxysilane, γ-mercaptopropyltriethoxysilane, and γ-mercaptopropylmethyldiethoxysilane.

Specific examples of the above polyamine to be used for extending a chain include diamines such as ethylenediamine, 1,2-propanediamine, 1,6-hexamethylenediamine and piperazine, polyamines such as diethylenetriamine, dipropylenetriamine and triethylenetetramine, and hydrazine. These compounds may be used alone or in combination of two or more species thereof.

A reaction by which polyurethane prepolymer is obtained from the above active hydrogen compound such as polyol and the above isocyanate group-containing compound is preferably performed at a reaction temperature of 30 to 100° C. in the presence of or in the absence of an organic solvent.

When the organic solvent is used, an organic solvent having relatively high solubility in water is preferred and specific examples of the above organic solvent include acetone, methyl ethyl ketone, acetonitrile, N-methylpyrrolidone and the like.

A method of dispersing the above polyurethane prepolymer in water includes, for example, a method of using a homogenizer, a mixer or the like. Temperature in dispersing the above polyurethane prepolymer is preferably from room temperature to about 70° C.

When the above-mentioned reaction is performed in a solvent, the solvent can be removed by distilling the solvent under a reduced pressure as required.

The above resin particle (A-2) is not particularly limited as long as it has an average particle diameter of 20 to 100 nm and is an ethylene-unsaturated carboxylic acid copolymerization resin having a silanol group and/or an alkoxysilyl group, but among others, a resin particle obtained by reacting a water dispersion of resin, which is prepared by neutralizing an ethylene-methacrylic acid copolymerization resin with hydroxide of alkali metal and/or ammonia or amine and dispersing the resulting neutralized product in water, with alkoxysilanes containing an epoxy group is preferred in that a finer particle can be formed and a high-performance coat can be formed.

Specific examples of the above-mentioned alkoxysilanes containing an epoxy group include γ-glycidoxypropyltrimethoxysilane, γ-glycidoxypropylmethyldimethoxysilane, γ-glycidoxypropyltriethoxysilane, γ-glycidoxypropylmethyldiethoxysilane, and 2-(3,4-epoxycyclohexyl)ethyltrimethoxysilane. These compounds may be used alone or in combination of two or more species thereof.

The above alkoxysilanes containing an epoxy group are preferably mixed in an amount 0.1 to 20% by mass with respect to the solid matter of the above water-borne dispersion resin to react the alkoxysilanes with the water-borne dispersion resin. The alkoxysilanes are more preferably mixed in an amount 1 to 10% by mass with respect to the solid matter of the water-borne dispersion resin. When these amounts of the alkoxysilanes to be mixed is less than 0.1% by mass, the alkali resistance and the adhesion property to a curable resin such as a coating composition, which a coat formed on the surface of a steel material has, may be deteriorated, and when these amounts are more than 20% by mass, the bath stability of a water-borne coating agent may be deteriorated.

The reaction of the water dispersion of resin with the above alkoxysilanes containing an epoxy group may be performed in combination with a polyfunctional epoxy compound. The epoxy compound includes sorbitol polyglycidyl ether, pentaerythritol polyglycidyl ether, glycerol polyglycidyl ether, diglycerol polyglycidyl ether, propylene glycol diglycidyl ether, triglycidyl tris(2-hydroxyethyl) isocyanurate, bisphenol A diglycidyl ether and hydrogenated bisphenol A diglycidyl ether. These compounds may be used alone or in combination of two or more species thereof.

The reaction of the above alkoxysilanes containing an epoxy group and polyfunctional epoxy compounds with a water dispersion of the above ethylene-unsaturated carboxylic acid is preferably performed at 50 to 100° C. for 0.5 to 12 hours.

The above polyurethane resin particle (A-1) and the above ethylene-unsaturated carboxylic acid copolymerization resin particle (A-2) are used in combination in the proportions of 20:80 to 90:10 by mass. When a ratio of the resin particles (A-1) is less than 20% by mass, the hydrophobicity of a coat becomes high and therefore the tape peeling resistance may be deteriorated or the solvent resistance to a high hydrophobic solvent such as white gasoline may be low. On the other hand, when the ratio of the resin particles (A-1) is more than 90% by mass, the hydrophilicity of a coat becomes high and therefore the alkali resistance and the solvent resistance to a high hydrophilic solvent such as ethanol may be deteriorated or the coat may become brittle resulting in the deterioration of the corrosion resistance of a processed portion.

The above resin particles (A-1) and (A-2) can initiate a reaction with the silicon oxide particle (A-3) and the organic titanium compound (A-4) to form a composite coat and can improve the solvent resistance and the alkali resistance by having the silanol group and/or the alkoxysilyl group.

The above resin particles (A-1) and (A-2) have an average particle diameter of 20 to 100 nm, respectively. Here, the average particle diameter can be measured by a dynamic light scattering method. When the average particle diameter is less than 20 nm, a problem that the workability of coat is deteriorated because the viscosity on coating is too high and the stability of a treatment agent is low arises. When the average particle diameter is more than 100 nm, a problem of the deterioration of tape peeling resistance and solvent resistance arises in coat performance.

An average particle diameter of the above resin particle (A-1) can be held within the above range by controlling quantities of hydrophilic functional groups for attaining water-dispersibility, for example, a carboxylic acid group or a sulfonic acid group, to be introduced and species and quantities of neutralizers to neutralize the hydrophilic functional groups.

An average particle diameter of the above resin particle (A-2) can be held within the above range by controlling species of neutralizers, conditions of dispersing in water, species and quantities of alkoxysilane compounds, and species and quantities of polyfunctional epoxy compounds.

As the above-mentioned silicon oxide particle (A-3), a particle having an average particle diameter of about 5 to 20 nm is suitable, and the silicon oxide particle (B) can be appropriately selected from colloidal silica and fumed silica to be used. Specific examples include SNOWTEX-N, SNOWTEX-C (produced by NISSAN CHEMICAL INDUSTRIES, LTD.), ADELITE AT-20N, ADELITE AT-20A (produced by Asahi Denka CO., LTD.), and CATALOID S-20L, CATALOID SA (produced by Catalysts & Chemicals Industries Co., Ltd.). These silicon oxide particles may be used alone or in combination of two or more species thereof.

Specific examples of compounds to be used as the above-mentioned organic titanium compound (A-4) include dipropoxybis(triethanolaminato) titanium, dipropoxybis(diethanolaminato) titanium, dibutoxybis(triethanolaminato)

titanium, dibutoxybis(diethanolaminato) titanium, dipropoxybis(acetylacetonato) titanium, dibutoxybis(acetylacetonato) titanium, dihydroxybis(ammonium lactato) titanium, dihydroxybis(diammonium lactato) titanium, propanedioxytitaniumbis(ethylacetoacetate), and oxotitaniumbis(monoammonium oxalate). These compounds may be used alone or in combination of two or more species thereof.

The above composite coat is a coat in a state in which the resin particles (A-1) and (A-2), the silicon oxide particles (A-3) and the organic titanium compound (A-4) are combined with one another. That is, this is a state in which a functional group in the surface of the resin particle, a functional group in the surface of the silicon oxide particle and a functional group in the organic titanium compound form the combinations and are compounded.

The above-mentioned combination is a combination formed by a reaction primarily of a Si—OH group and/or a Si—OR group of the resin particles (A-1) and (A-2), a Si—OH group at the surface of the silicon oxide particle (A-3) and a Ti—OH group and/or a Ti—OR' group of the organic titanium compound (A-4), and these combinations are assumed to be a Si—O—Si bond, a Si—O—Ti—O—Si bond and the like. By these bonds, an advantageous effect that an organic resin particle forms a chemically strong combination with an inorganic particle is attained.

In the above composite coat, an amount of the above silicon oxide particle (A-3) is preferably 5 to 100% by mass with respect to the total amount of the above resin particles (A-1) and (A-2). When this amount is less than 5% by mass, the hardness and the corrosion resistance of a coat formed on the surface of a steel material may be deteriorated. When the amount is more than 100% by mass, the film forming property and the water resistance of a coat may be deteriorated. This amount is more preferably 10 to 50% by mass.

In the above composite coat, the content of a titanium atom is preferably 0.05 to 3% by mass with respect to 100% by mass of the total amount of a coat. When the content of the titanium atom is less than 0.05% by mass, compounding of the respective components in a coat formed is insufficient, and therefore the performance of the coat may be deteriorated. When this content is more than 3% by mass, the affinity for water of the coat becomes too large, and therefore the performance of the coat may be deteriorated or the bath stability of a water-borne coating agent to be used may be deteriorated. The content of the titanium atom is more preferably 0.1 to 2% by mass.

The above composite coat in the coated steel sheet contains further the polyolefin wax particle (B). The polyolefin wax particle (B) decreases the coefficient of kinetic friction of the above composite coat and enhances the lubricity of the surface of the composite coat but it also causes a decrease in the hardness of a coat and a decrease in the coefficient of static friction, and therefore the polyolefin wax particle (B) alone cannot attain satisfactory performance. In the present invention, the silicon oxide particle (C) having an average particle diameter of 70 to 200 nm is further used in combination in addition to the polyolefin wax particle (B). That is, the composite coat of the present invention has the silicon oxide particle (C) having a large particle diameter in addition to the silicon oxide particle (A-3) constituting a part of the above compounded resin (A). The above silicon oxide particle (C) has the effects of improving abrasion resistance in order to enhance the hardness of a coat, which has been reduced due to the polyolefin wax particle (B), and increase a coefficient of static friction and simultaneously improving handling that coil crushing of a coated steel sheet and collapse of cargo of cut plate do not occur. In order to satisfy the above various performance, it is preferred that the coefficient of kinetic friction is less than 0.1 and the coefficient of static friction is more than 0.1. In addition, it is assumed that the above silicon oxide particle (C) forms a Si—O—Si bond, a Si—O—Ti—O—Si bond and the like by a reaction of a Si—OH group at the surface of the particle with components constituting the above compounded resin (A) and is compounded as with the silicon oxide particle (A-3).

The above polyolefin wax particles (B) having an average particle diameter of 0.5 to 4 μm and a softening point of 100 to 140° C. is not particularly limited and includes hydrocarbon waxes such as paraffin wax, microcrystalline wax and polyethylene wax and derivatives thereof. The above-mentioned derivative is not particularly limited and includes, for example, carboxylated polyolefin, chlorinated polyolefin and the like.

The above-mentioned polyolefin wax particles (B) have a particle diameter of 0.5 to 4 μm. When the particle diameter of the polyolefin wax particles (B) is more than 4 μm, the distribution of a lubricant may become nonuniform or the falling out of the coat may occur. And, when the particle diameter is less than 0.5 μm, the lubricity may be insufficient. Incidentally, the particle diameter of the polyolefin wax particles (B) is a value measured by a dynamic light scattering method.

The above polyolefin wax particle (B) has a softening point of 100 to 140° C. When the softening point is lower than 100° C., the wax is softened and melted in processing the wax and an excellent property as a lubricant may not be exerted. And, when the softening point is higher than 140° C., since a hard particle will exist at the surface, a lubrication characteristic is deteriorated and adequate lubricity may not be attained.

In the coat in the above coated steel sheet, the content of the above polyolefin wax particles (B) is preferably 0.1% by mass (lower limit) to 20% by mass (upper limit) in 100% by mass of the coat. When the content of the polyolefin wax particle (B) is less than 0.1% by mass, the effects of reducing a friction coefficient and improving abrasion resistance are small, and when the content is more than 20% by mass, the coefficient of static friction of the coated steel sheet may become too low interfering with handling. The above lower limit is more preferably 0.5% by mass and the above upper limit is more preferably 10% by mass.

The above-mentioned silicon oxide particles (C) having an average particle diameter of 70 to 200 nm is not particularly limited and include and a publicly known particle can be used. Commercially available particles include ST-ZL, MP-1040 (produced by Nissan Chemical Industries Co., Ltd.), PL-7 (produced by Fuso Chemical Co., Ltd.) and SI-80P (produced by Catalysts & Chemicals Industries Co., Ltd.). These particles may be used alone or in combination of two or more species thereof.

The above-mentioned silicon oxide particles (C) have a particle diameter of 70 to 200 nm. The particle having a particle diameter of more than 200 nm is apt to precipitate in a water-borne coating agent and hard to handle. And, when the particle diameter is less than 70 nm, an effect of enhancing a coefficient of static friction or a surface hardness may be insufficient. Incidentally, the particle diameter of the silicon oxide particles (C) is a value measured by a dynamic light scattering method.

In the coat in the above coated steel sheet, the content of the above silicon oxide particle (C) is preferably 0.1% by mass (lower limit) to 30% by mass (upper limit) in 100% by mass of the coat. When the content of the silicon oxide particle (C) is less than 0.1% by mass, the effects of enhancing a coefficient of static friction and improving a surface hardness are small, and when the content is more than 30% by mass, the corrosion resistance may be deteriorated. The above lower limit is more preferably 0.3% by mass and the above upper limit is more preferably 15% by mass.

The above coated steel sheet may be provided with a coat formed by further compounding at least one rust preventive agent (D) selected from the group consisting of phosphate compounds, thiocarbonyl compounds, niobium oxide and guanidine compounds. Thereby, the above coated steel sheet can attain the excellent corrosion resistance.

The above-mentioned phosphate compound includes phosphoric acids such as orthophosphoric acid, metaphosphoric acid, pyrophosphoric acid, triphosphoric acid and tetraphosphoric acid, and phosphates such as triammonium phosphate, ammonium phosphate dibasic, trisodium phosphate and disodium hydrogenphosphate. These phosphate compounds may be used alone or in combination of two or more species thereof. When the above phosphate compound is used, since a phosphate ion forms a phosphate layer on the surface of a metal base to passivate the metal, a rust preventing property can be improved.

The thiocarbonyl compound, the niobium oxide and the guanidine compound are particularly effective for the prevention of white rust of a galvanized steel sheet as with chromium compounds which have been previously used for providing the corrosion resistance.

The above-mentioned thiocarbonyl compound is expressed by the following general formula (1):

(1)

wherein X and Y are the same or different from each other, and represent H, OH, SH or NH$_2$, or a hydrocarbon group having 1 to 15 carbon atoms, optionally having OH, SH or NH$_2$ as a substituent and containing —O—, —NH—, —S—, —CO— or —CS—, and X and Y are optionally combined with each other to form a ring.

The thiocarbonyl compound expressed by the above general formula (1) refers to a compound having a thiocarbonyl group expressed by the following formula (I):

(I)

among thiocarbonyl groups, a preferred one is a thiocarbonyl group having a nitrogen atom or an oxygen atom, expressed by the following formula (II):

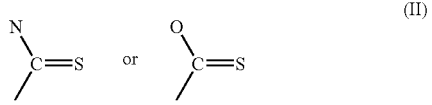

(II)

Further, a compound, which can form a thiocarbonyl group-containing compound in an aqueous solution, or in the presence of acid or alkali, can also be used. Examples of the above-mentioned thiocarbonyl compound include thiourea and derivatives thereof expressed by the following formula (III):

(III)

for example, methylthiourea, dimethylthiourea, trimethylthiourea, ethylthiourea, diethylthiourea, 1,3-dibutylthiourea, phenylthiourea, diphenylthiourea, 1,3-bis(dimethylaminopropyl)-2-thiourea, ethylenethiourea, and propylenethiourea.

Further, the above-mentioned thiocarbonyl compound includes carbothioic acids and salts thereof expressed by the following formula (IV):

(IV)

for example, thioacetic acid, thiobenzoic acid, dithioacetic acid, sodium methyldithiocarbamate, sodium dimethyldithiocarbamate, triethylamine dimethyldithiocarbamate, sodium diethyldithiocarbamate, piperidine pentamethylenedithiocarbamate, pipecoline pipecolildithiocarbamate, and potassium o-ethylxanthogenate.

These thiocarbonyl compounds may be used alone or in combination of two or more species thereof. Further, among these thiocarbonyl compounds, a thiocarbonyl compound being not dissolved in water can be mixed into a coating agent to be used after dissolving it with an alkali solution once.

The above-mentioned niobium oxide is preferably a niobium oxide colloidal particle. Thereby, a coat formed by compounding niobium oxide colloidal particles can be formed and the corrosion resistance can be more improved. When the average particle diameter of the above niobium oxide colloidal particles is smaller, it is more preferred because a more stable and compact coat containing niobium oxide is formed and therefore it is possible to stably provide a rust preventing property for a substrate to be treated.

The above-mentioned niobium oxide colloidal particles refers to particles in which the oxide of niobium is dispersed in a state of a fine particle in water, and these colloidal particles may be, for example, such particles that strictly speaking, niobium oxide is not formed and particles become an amorphous state in an intermediate state between niobium hydroxide and niobium oxide.

As a niobium oxide particle added to the water-borne coating agent to be used for forming the composite coat, niobium oxide sol produced by a publicly known method can be used. The above-mentioned niobium oxide sol is not particularly limited and includes, for example, niobium oxide sol produced by publicly known methods described in Japanese Kokai Publication Hei6-321543, Japanese Kokai Publication Hei8-143314, and Japanese Kokai Publication Hei8-325018. And, niobium oxide sol, which is commercially available from Taki Chemical Co., Ltd., can also be employed.

The above-mentioned niobium oxide colloidal particles preferably have an average particle diameter of 100 nm or less. The above average particle diameter is more preferably 2 to 50 nm, and furthermore preferably 2 to 20 nm. When the above average particle diameter is smaller, it is more preferred because a more stable and compact coat containing niobium oxide is formed and therefore it is possible to stably provide a rust preventing property for a substrate to be treated. The average particle diameter of the above-mentioned niobium oxide colloidal particles can be measured by a dynamic light scattering method.

The above-mentioned guanidine compound is expressed by the following formula (2):

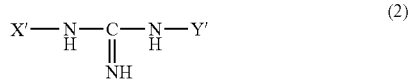

(2)

wherein X' and Y' are the same or different from each other, and represent H, $NH_2$, a phenyl group or a methylphenyl group (a tolyl group), or optionally have H, $NH_2$, a phenyl group or a methylphenyl group (a tolyl group) as a substituent and contain —C(=NH)—, —CO— or —CS—.

Examples of the above guanidine compound include guanidine, aminoguanidine, guanylthiourea, 1,3-di-o-tolylguanidine, 1-o-tolylbiguanide, and 1,3-diphenylguanidine. The above-mentioned guanidine compounds may be used alone or in combination of two or more species thereof.

When the above composite coat contains a phosphate compound, the content of the phosphate radical derived from the above phosphate compound is preferably 0.01 to 5% by mass in 100% by mass of the coat. When the content of the phosphate radical is less than 0.01% by mass, corrosion resistance becomes insufficient, and when the content is more than 5% by mass, in some water-borne dispersion resins to be used, the water dispersion may gelate and it may become impossible to apply the water dispersion. The content of the phosphate radical is more preferably 0.05 to 3% by mass.

When the above composite coat contains a thiocarbonyl compound, the content of the above thiocarbonyl compound is preferably 0.1 to 10% by mass in 100% by mass of the coat. When the content of the thiocarbonyl compound is less than 0.1% by mass, corrosion resistance becomes insufficient, and when the content is more than 10% by mass, not only it is economically disadvantageous since a degree of the corrosion resistance is saturated, but also in some water-borne dispersion resins to be used, the water dispersion may gelate and it may become impossible to apply the water dispersion. The content of the thiocarbonyl compound is more preferably 0.2 to 5% by mass.

When the above composite coat contains niobium oxide, the content of the above niobium oxide is preferably 0.1 to 5% by mass on the $Nb_2O_5$ equivalent basis in 100% by mass of the coat. When the content of the niobium oxide is less than 0.1% by mass, undesirably, an adequate rust preventing property cannot be attained, and when the content is more than 5% by mass, it may be economically disadvantageous since there is no increase in a rust-preventive effect. The content of the niobium oxide is more preferably 0.2 to 3% by mass.

When the above composite coat contains a guanidine compound, the content of the above guanidine compound is preferably 0.1 to 5% by mass in 100% by mass of the coat. When the content of the guanidine compound is less than 0.1% by mass, corrosion resistance becomes insufficient, and when the content is more than 5% by mass, not only it is economically disadvantageous since a degree of the corrosion resistance is saturated, but also in some water-borne dispersion resins to be used, the water dispersion may gelate and it may become impossible to apply the water dispersion. The content of the guanidine compound is more preferably 0.2 to 3% by mass.

Another component other than the above substances (A) to (D) may be contained in the coat formed on the surface of a metal sheet in the coated steel sheet. For example, a pigment may be mixed as another component. As the above-mentioned pigment, various coloring pigments like inorganic pigments such as titanium oxide ($TiO_2$), zinc oxide (ZnO), calcium carbonate ($CaCO_3$), barium sulfate ($BaSO_4$), alumina ($Al_2O_3$), kaolin clay, carbon black, iron oxides ($Fe_2O_3$, $Fe_3O_4$) and the like, and like organic pigments can be used.

As the steel material in the present invention, there may be mentioned, for example, zinc-based plated steel sheets such as a galvanized steel sheet, a zinc-nickel-plated steel sheet, a zinc-iron-plated steel sheet, a zinc-chromium-plated steel sheet, a zinc-aluminum-plated steel sheet, a zinc-titanium-plated steel sheet, a zinc-magnesium-plated steel sheet, a zinc-manganese-plated steel sheet, a zinc-aluminum-magnesium-plated steel sheet and a zinc-aluminum-magnesium-silicon-plated steel sheet, and further plated steel sheets formed by including a small amount of cobalt, molybdenum, tungsten, nickel, titanium, chromium aluminum, manganese, iron, magnesium, lead, bismuth, antimony, tin, copper, cadmium and arsenic as a heterogeneous metal element or an impurity in a plating layer of each of these zinc-based plated steel sheets and by dispersing inorganic substances such as silica, alumina, titania and the like similarly in a plating layer of each of these zinc-based plated steel sheets. Further, the composite coat of the present invention can also be applied to the plating of a multiple layer formed by combining the plating described above with another kinds of plating such as iron plating, iron-phosphorus plating, nickel plating and cobalt plating. Further, it can also be applied to aluminum or aluminum alloy plating. A method of plating is not particularly limited and any method of the publicly known electroplating method, hot-dipping method, evaporation coating method, dispersion plating method and vacuum deposition method may be employed.

As the steel material in the present invention, there may be mentioned, for example, zinc-based plated steel sheets such as a galvanized steel sheet, a zinc-nickel-plated steel sheet, a zinc-iron-plated steel sheet, a zinc-chromium-plated steel sheet, a zinc-aluminum-plated steel sheet, a zinc-titanium-plated steel sheet, a zinc-magnesium-plated steel sheet, a zinc-manganese-plated steel sheet, a zinc-aluminum-magnesium-plated steel sheet and a zinc-aluminum-magnesium-silicon-plated steel sheet, and further plated steel sheets formed by including a small amount of cobalt, molybdenum, tungsten, nickel, titanium, chromium aluminum, manganese, iron, magnesium, lead, bismuth, antimony, tin, copper, cadmium and arsenic as a heterogeneous metal element or an impurity in a plating layer of each of these zinc-based plated steel sheets and by dispersing inorganic substances such as silica, alumina, titania and the like similarly in a plating layer of each of these zinc-based plated steel sheets. Further, the composite coating of the present invention can also be applied to the plating of a multiple layer formed by combining the plating described above with another kinds of plating such as iron plating, iron-phosphorus plating, nickel plating and cobalt plating. Further, it can also be applied to aluminum or aluminum alloy plating. A method of plating is not particularly limited and any method of the publicly known electroplating method, hot-dipping method, evaporation coating method, composite plating method and vacuum deposition method may be employed.

An antifoaming agent, an organic solvent or a leveling agent may be used in a water-borne coating agent to be used for forming the above composite coat in order to form a more uniform and smooth coat. The organic solvent for this is not particularly limited as long as it is an organic solvent generally used in coating compositions and includes, for example, hydrophilic solvents such as an alcohol solvent, a ketone solvent, an ester solvent, an ether solvent and the like, and leveling agents such as a silicone leveling agent, a fluorine leveling agent and the like.

A method of coating a water-borne coating agent to be used for forming the above composite coat is a method of forming a coat by applying the above water-borne coating agent onto the metal surface. A method of applying the water-borne coating agent for steel materials is not particularly limited and a roller coating method, an air spray method, an airless spray method or an immersion method, which is usually used, can be appropriately adopted. It is preferred to heat the substance to be coated in advance or to dry the substance to be coated by heating after applying in order to enhance the curability of a coat. A heating temperature of the substance to be coated is 50 to 250° C., preferably 70 to 220° C. When the heating temperature is lower than 50° C., an evaporation rate of water is low and an adequate film forming property cannot be attained, and therefore the solvent resistance and the alkali resistance of a composite coat are deteriorated. On the other hand, when the heating temperature is higher than 250° C., the thermal decomposition of resin occurs and therefore properties of a coat are deteriorated resulting in a reduction in various performance and the appearance of a coat is degraded due to yellowing. When the water-borne coating agent for steel materials is dried by heating after applying it, a drying time is preferably 1 second to 5 minutes.

An amount of the coat of the above composite coat is 0.5 to 3 g/m². When the above amount of the coat is less than 0.5 g/m², the corrosion resistance or the alkali resistance may be deteriorated. On the other hand, when the above amount of the coat is too much, not only the adhesion property to a substrate is deteriorated, but also it is uneconomical. The amount of the coat is more preferably 0.5 to 2 g/m².

And, the coated steel sheet of the present invention can also be used in a state in which a coating film is formed by applying a finishing paint onto the above composite coat. The finishing paint includes, for example, coating compositions consist of an acrylic resin, an acrylic modified alkyd resin, an epoxy resin, an urethane resin, a melamine resin, a phthalic resin, an amino resin, a polyester resin or a vinyl chloride resin.

A film thickness of the coating film of the finishing paint is appropriately determined in accordance with the uses of anti-corrosive metal products or the species of a finishing paint to be used and is not particularly limited. This film thickness is usually about 5 to 300 μm, more preferably about 10 to 200 μm. The coating film of the finishing paint can be formed by applying a finishing paint onto a coat formed by applying the above water-borne coating agent, and drying and curing the applied finishing paint by heating. A drying temperature and a drying time are appropriately adjusted in accordance with the species of a finishing paint to be applied or the film thickness of a coating film, and generally the drying temperature is preferably 50 to 250° C. and the drying time is preferably 5 minutes to 1 hour. The application of the finishing paint can be performed by publicly known methods in accordance with the form of the finishing paint.

In the above-mentioned coated steel sheet on which a coating film is formed by further applying the finishing paint, the coat formed on the steel sheet has an excellent adhesion to the coating film of a finishing paint.

The coated steel sheet of the present invention is provided with a composite coat on the surface of the steel sheet, which comprises a compounded resin (A) formed by compounding polyurethane resin particles (A-1) and ethylene-unsaturated carboxylic acid copolymerization resin particles (A-2), respectively having an average particle diameter of 20 to 100 nm and a silanol group and/or an alkoxysilyl group, silicon oxide particles (A-3) having an average particle diameter of 5 to 20 nm and an organic titanium compound (A-4), polyolefin wax particles (B) having an average particle diameter of 0.5 to 4 μM and a softening point of 100 to 140° C., and silicon oxide particles (C) having an average particle diameter of 70 to 200 nm, and has an amount of a coat of 0.5 to 3 g/m². Thereby, the coated steel sheet of the present invention has excellent performance in corrosion resistance of a processed portion, tape peeling resistance, solvent resistance, alkali resistance and abrasion resistance.

BEST MODE FOR CARRYING OUT THE INVENTION

Next, the present invention will be described more specifically by way of Production Examples of a water-borne dispersion resin, Examples and Comparative Examples.

Production of Water Dispersion of Polyurethane Resin Particle (A-1)

Production Example 1

Into a reaction vessel, 4,4-methylenebis(cyclohexyl isocyanate), polycarbonate diol having a molecular weight of 2000, neopentyl glycol, dimethylolpropionic acid, and N-methyl pyrrolidone as a solvent were charged, and the resulting mixture was stirred at 80° C. for 6 hours and then neutralized with dimethylethanolamine to obtain a polyurethane prepolymer solution. Next, a water dispersion of a polycarbonate-based polyurethane resin particle containing a silanol group and/or an ethoxysilyl group was prepared by dispersing the polyurethane prepolymer solution obtained by the above reaction in water containing hydrazine and γ-(2-aminoethyl) aminopropyltriethoxysilane with a homodisper stirrer. This water dispersion had a solid content of 30% by mass and an average particle diameter of the resin particles measured by a dynamic light scattering method was 39 nm.

Production Example 2

A water dispersion of a polycarbonate-based polyurethane resin particle not containing a silanol group nor an alkoxysilyl group was prepared by dispersing a polyurethane prepolymer obtained in the same manner as in Production Example 1 in an aqueous solution of hydrazine with a homodisper stirrer. This water dispersion had a solid content of 30% by mass and an average particle diameter of the resin particles was 36 nm.

Production Example 3

Into a reaction vessel, 4,4-methylenebis(cyclohexyl isocyanate), dimethylolpropionic acid, and acetone were put, and the mixture was heated to 50° C. while stirring and reacted, and then to this, polyester polyol having a molecular weight of 2000, which has been obtained by reacting adipic acid, neopentyl glycol and ethylene glycol, was added and the resulting mixture was reacted to obtain a polyurethane prepolymer solution. Next, a water dispersion of a polyester-based polyurethane resin particle containing a silanol group and/or an ethoxysilyl group was prepared by dispersing the polyurethane prepolymer solution obtained by the above reaction in water containing dimethylethanolamine, γ-(2-aminoethyl)aminopropyltriethoxysilane and 2-(2-aminoethylamino) ethanol with a homodisper stirrer and distilling off the acetone while heating. This water dispersion had a solid content of 30% by mass and an average particle diameter of the resin particles was 32 nm.

Production of Water Dispersion of
Ethylene-Unsaturated Carboxylic Acid
Copolymerization Resin Particle (A-2)

Production Example 4

In a reaction vessel, an ethylene-methacrylic acid copolymerization resin (the content of methacrylic acid was 20% by mass) was put, and to this, sodium hydroxide in an amount of 5.6% by mass with respect to the amount of the above copolymerization resin and deionized water were added, and the resulting mixture was stirred at 95° C. for 6 hours to obtain a water dispersion of resin having a solid content of 20% by mass. To this water dispersion of resin, γ-glycidoxypropyltrimethoxysilane in an amount of 0.8% by mass and glycerol polyglycidyl ether in an amount of 0.8% by mass were further added, and the resulting mixture was reacted at 85° C. for 2 hours to obtain a water dispersion of an ethylene-methacrylic acid copolymerization resin particle having a silanol group and/or a methoxysilyl group. This water dispersion had a solid content of 21% by mass and an average particle diameter of the resin particles was 76 nm.

Production Example 5

In a reaction vessel, an ethylene-methacrylic acid copolymerization resin (the content of methacrylic acid was 20% by mass) was put, and to this, sodium hydroxide in an amount of 3.7% by mass with respect to the amount of the above copolymerization resin, an ammonia water (concentration 25% by mass) in an amount of 6.3% by mass, and deionized water were added, and the resulting mixture was stirred at 95° C. for 6 hours to obtain a water dispersion of resin having a solid content of 20% by mass. To this water dispersion of resin, γ-glycidoxypropyltriethoxysilane in an amount of 1.2% by mass and pentaerythritol polyglycidyl ether in an amount of 0.6% by mass were further added, and the resulting mixture was reacted at 85° C. for 2 hours to obtain a water dispersion of an ethylene-methacrylic acid copolymerization resin particle having a silanol group and/or a methoxysilyl group. This water dispersion had a solid content of 21% by mass and an average particle diameter of the resin particles was 84 nm.

Production Example 6

In a reaction vessel, an ethylene-methacrylic acid copolymerization resin (the content of methacrylic acid was 20% by mass) was put, and to this, sodium hydroxide in an amount of 4.7% by mass with respect to the amount of the above copolymerization resin and deionized water were added, and the resulting mixture was stirred at 95° C. for 2 hours to obtain a water dispersion of resin having a solid content of 20% by mass. To this water dispersion of resin, γ-glycidoxypropyltrimethoxysilane in an amount of 1.2% by mass and hydrogenated bisphenol A diglycidyl ether in an amount of 1.2% by mass were further added, and the resulting mixture was reacted at 85° C. for 2 hours to obtain a water dispersion of an ethylene-methacrylic acid copolymerization resin particle having a silanol group and/or a methoxysilyl group. This water dispersion had a solid content of 21% by mass and an average particle diameter of the resin particles was 145 nm.

Examples 1 to 12, Comparative Examples 1 to 18

Preparation of Coated Steel Sheet

Preparation of Test Sheet

An electrogalvanized steel sheet (quantity of zinc deposited: 20 g/m$^2$) and a hot-dip galvanized steel sheet (quantity of zinc deposited: 60 g/m$^2$) of 0.8 mm in thickness, respectively, were degreased at 60° C. for 30 seconds by spraying a 2% by mass aqueous solution of an alkaline degreasing agent (SURF CLEANER 155 produced by Nippon Paint Co., Ltd.). Next, water-borne coating agents were prepared by compounding the resin particles obtained in above-mentioned Production Examples and substances shown in Tables 1 to 5 according to the formulations shown in Tables 6 and 7, and these water-borne coating agents were applied to the degreased steel sheets with a bar coater in such a manner that an amount of a dried coat was 1 g/m$^2$ and the steel sheets were baked in a hot-air oven having an ambient temperature of 500° C. until a temperature of the steel sheet reached 150° C. and test sheets were prepared.

Evaluation Method

An adhesion property to a substrate, tape peeling resistance, an adhesion property to a paint, corrosion resistance of a processed portion, solvent resistance (three species of ethanol, methyl ethyl ketone, and white gasoline), alkali resistance, a coefficient of kinetic friction, a coefficient of static friction, and abrasion resistance were evaluated. The evaluations were carried out according to the following criteria.

Adhesion Property to Substrate

After each test sheet prepared was extruded by 8 mm by an Erichsen tester, cellotape (produced by NICHIBAN CO., LTD.) was stuck to an extruded portion and then peeled forcibly. The test sheet was immersed in a methyl violet stain and a state of a coat after peeling the cellotape was rated according to the following criteria.

○: There is no peeling
Δ: Peeled area is less than 10%
X: Peeled area is 10% or more Tape Peeling Resistance A filament tape (produced by Sliontec Corporation) was stuck to the test sheet and the test sheet was left standing under the conditions of 40° C. and 80% relative humidity for one week and the filament tape was peeled forcibly. A state of a coat after peeling the filament tape was observed and rated according to the following criteria.

○: There is few peeling
Δ: Peeled area is less than 50%
X: Peeled area is 50% or more Adhesion Property of Coat A melamine alkyd coating composition (Superlac 100 produced by Nippon Paint Co., Ltd.) was applied onto the surface of the test sheet with a bar coater in such a manner that a dried film thickness was 20 μm and the steel sheet was baked at 120° C. for 25 minutes to prepare a coated plate. After the coated plate was left standing for a day, it was immersed in boiled water for 30 minutes and after it was taken out, it was left standing for a day. Then, cutting of 100 checkerboard patterns was performed at 1 mm spacing on the coated test sheet and a cellotape (produced by NICHIBAN CO., LTD.) was stuck to the grid sections and then peeled forcibly. A state of a coat after peeling the cellotape was observed and rated according to the following criteria.

○: Number of peeled grids is 0
Δ: Number of peeled grids is 49 or less
X: Number of peeled grids is 50 or more Corrosion Resistance of Processed Portion The test sheet was extruded by 7 mm by an Erichsen tester and edges and a backside of the test sheet were sealed with tapes and a salt spray test SST (JIS Z 2371) was carried out. A state in which white rust was produced after a lapse of 120 hours was observed and rated according to the following criteria.
○: There is few white rust
Δ: Area where white rust was produced is less than 30%
X: Area where white rust was produced is 30% or more Solvent Resistance The test sheet was set on a rubbing tester and traced to and for five times with a load of 0.5 Kgf/cm$^2$ being applied with absorbent cotton impregnated with ethanol, methyl ethyl ketone (MEK) or white gasoline and then edges and a backside of the test sheet were sealed with tapes and a salt spray test (JIS Z 2371) was carried out. A state in which white rust was produced after a lapse of 72 hours was observed and rated according to the following criteria.
○: There is few white rust
Δ: Area where white rust was produced is less than 30%
X: Area where white rust was produced is 30% or more Alkali Resistance The test sheet was immersed in a 2% by mass aqueous solution (pH 12.5) of an alkaline degreasing agent (SURF CLEANER 53 produced by Nippon Paint Co., Ltd.) of 55° C. for 2 minutes while stirring the aqueous solution and then edges and a backside of the test sheet were sealed with tapes and a salt spray test (JIS Z 2371) was carried out. A state in which white rust was produced after a lapse of 72 hours was observed and rated according to the following criteria.
○: There is few white rust
Δ: Area where white rust was produced is less than 30%
X: Area where white rust was produced is 30% or more Coefficient of Kinetic Friction The test sheet was set on a HEIDON type kinetic friction coefficient tester and a coefficient of kinetic friction was measured under the conditions of rubbing by a stainless steel ball of 10 mm in diameter, a load of 100 g and a rubbing speed of 150 mm/min. A preferred coefficient of kinetic friction as a criterion is less than 0.10.

Coefficient of Static Friction

Using a HEIDON type static friction coefficient tester, a test sheet having an area of 25 cm$^2$ from which burrs are removed was stuck to a flat indenter and the coefficient of static friction between the test sheets was measured at a test speed of 0.5°/sec at a load of 200 g. A preferred coefficient of static friction as a criterion is more than 0.10.

Abrasion Resistance

A load of 10 g/cm$^2$ was applied to the test sheet through a corrugated paper and an elliptic motion of 360 turns/min was added to this load to cause abrasions on a rubbing area. After conducting this testing for ten minutes, a state of the test sheet surface was observed and rated according to the following criteria.
○: There is few blackening
Δ: Area less than 50% of a rubbing area is blackened
X: 50% or more of a rubbing area is blackened The results of evaluations and measurements of the above-mentioned tests are shown in Tables 6 and 7.

TABLE 1

| Silicon oxide particle (A-3) | |
| --- | --- |
| Symbol | Particle diameter nm |
| a | 15 nm |

TABLE 2

| Organic titanium compound (A-4) | |
| --- | --- |
| Symbol | Material name |
| b | dipropoxybis(triethanolaminato)titanium |

TABLE 3

| Polyolefin wax particle (B) | | | |
| --- | --- | --- | --- |
| Symbol | Species | Particle diameter μm | Softening point ° C. |
| c | polyethylene | 1.0 | 115 |
| d | polyethylene | 1.0 | 136 |
| e | polyethylene | 2.5 | 113 |
| f | polyethylene | 0.2 | 115 |
| g | polypropylene | 1.0 | 148 |

TABLE 4

| Silicon oxide particle (C) | |
| --- | --- |
| Symbol | Particle diameter nm |
| h | 100 |
| i | 25 |

TABLE 5

| Rust preventive agent (D) | |
| --- | --- |
| Symbol | Material name |
| j | phosphate salt |
| k | thiourea |
| l | sodium diethyldithiocarbamate |
| m | niobium oxide |
| n | guanylthiourea |
| o | 1-o-tolylbiguanide |

TABLE 6

| | | Electrogalvanized steel sheet | | | | | | | | | |
| --- | --- | --- | --- | --- | --- | --- | --- | --- | --- | --- | --- |
| | | Compositions of coat (mass ratio) | | | | | | | | | |
| | | A-1 | | A-2 | | A-3 | | A-4 | | B | |
| | | Species | Quantity | Species | Quantity | Species | Quantity | Species | Quantity* | Species | Quantity |
| Examples | 1 | Production Example 1 | 80 | Production Example 5 | 20 | a | 30 | b | 0.8 | c | 3 |
| | 2 | Production Example 1 | 70 | Production Example 5 | 30 | a | 30 | b | 0.8 | c | 3 |
| | 3 | Production Example 3 | 70 | Production Example 5 | 30 | a | 35 | b | 0.4 | d | 3 |

TABLE 6-continued

Electrogalvanized steel sheet

|  |  | A species | A qty | B species | B qty | | | | | | | |
|---|---|---|---|---|---|---|---|---|---|---|---|---|
| Examples | 4 | Production Example 1 | 50 | Production Example 4 | 50 | a | 35 | b | 0.4 | d | 1.5 |
| | 5 | Production Example 1 | 50 | Production Example 4 | 50 | a | 25 | b | 0.8 | c | 3 |
| | 6 | Production Example 1 | 30 | Production Example 4 | 70 | a | 30 | b | 0.8 | c | 3 |
| Compar. Examples | 1 | Production Example 1 | 100 | — | — | a | 30 | b | 0.8 | c | 3 |
| | 2 | — | — | Production Example 5 | 100 | a | 25 | b | 0.8 | c | 3 |
| | 3 | Production Example 2 | 50 | Production Example 4 | 50 | a | 35 | b | 0.4 | d | 1.5 |
| | 4 | Production Example 1 | 30 | Production Example 6 | 70 | a | 30 | b | 0.8 | c | 3 |
| | 5 | Production Example 1 | 70 | Production Example 5 | 30 | a | 35 | b | 0.4 | | — |
| | 6 | Production Example 1 | 50 | Production Example 4 | 50 | a | 35 | b | 0.4 | e | 7.5 |
| | 7 | Production Example 1 | 50 | Production Example 4 | 50 | a | 25 | b | 0.8 | f | 7.5 |
| | 8 | Production Example 1 | 70 | Production Example 5 | 30 | a | 30 | b | 0.8 | g | 4.5 |
| | 9 | Production Example 3 | 70 | Production Example 5 | 30 | a | 35 | b | 0.4 | d | 3 |

| | | Compositions of coat (mass ratio) | | | | | Performance of coat | | |
|---|---|---|---|---|---|---|---|---|---|
| | | C | | D | | | Adhesion property to substrate | Tape peeling resistance | Adhesion property to paint |
| | | Species | Quantity | Species | Quantity** | Species | Quantity | | |
| Examples | 1 | h | 10 | j | 0.7 | k | 3.6 | ○ | ○ | ○ |
| | 2 | h | 5 | j | 1.2 | m | 1.3 | ○ | ○ | ○ |
| | 3 | h | 5 | j | 0.7 | n | 1.3 | ○ | ○ | ○ |
| | 4 | h | 5 | j | 0.7 | l | 1.3 | ○ | ○ | ○ |
| | 5 | h | 10 | j | 1.2 | m | 1.3 | ○ | ○ | ○ |
| | 6 | h | 1 | j | 0.7 | o | 1.3 | ○ | ○ | ○ |
| Compar. Examples | 1 | h | 10 | j | 0.7 | k | 3.6 | Δ | ○ | ○ |
| | 2 | h | 10 | j | 1.2 | m | 1.3 | Δ | X | ○ |
| | 3 | h | 5 | j | 0.7 | l | 1.3 | ○ | Δ | ○ |
| | 4 | h | 1 | j | 0.7 | o | 1.3 | Δ | Δ | Δ |
| | 5 | | — | j | 0.7 | n | 1.3 | ○ | ○ | ○ |
| | 6 | | — | j | 0.7 | l | 1.3 | ○ | ○ | Δ |
| | 7 | h | 10 | j | 1.2 | m | 1.3 | ○ | ○ | ○ |
| | 8 | h | 5 | j | 1.2 | m | 1.3 | ○ | ○ | ○ |
| | 9 | i | 5 | j | 0.7 | n | 1.3 | ○ | Δ | ○ |

| | | Performance of coat | | | | | | | |
|---|---|---|---|---|---|---|---|---|---|
| | | Corrosion resistance of processed portion | Solvent resistance | | | Alkali resistance | Coefficient of kinetic friction | Coefficient of static friction | Abrasion resistance |
| | | | Ethanol | MEK | White gasoline | | | | |
| Examples | 1 | ○ | ○ | ○ | ○ | ○ | 0.07 | 0.14 | ○ |
| | 2 | ○ | ○ | ○ | ○ | ○ | 0.06 | 0.12 | ○ |
| | 3 | ○ | Δ | ○ | ○ | Δ | 0.07 | 0.14 | ○ |
| | 4 | ○ | ○ | ○ | ○ | Δ | 0.09 | 0.17 | ○ |
| | 5 | ○ | ○ | ○ | ○ | ○ | 0.06 | 0.13 | ○ |
| | 6 | ○ | ○ | ○ | ○ | ○ | 0.06 | 0.12 | ○ |
| Compar. Examples | 1 | X | Δ | ○ | ○ | Δ | 0.08 | 0.12 | Δ |
| | 2 | ○ | ○ | ○ | Δ | ○ | 0.08 | 0.17 | ○ |
| | 3 | Δ | X | X | ○ | X | 0.08 | 0.16 | Δ |
| | 4 | Δ | ○ | ○ | Δ | Δ | 0.08 | 0.13 | Δ |
| | 5 | ○ | ○ | ○ | ○ | ○ | 0.12 | 0.25 | X |
| | 6 | ○ | ○ | ○ | ○ | ○ | 0.06 | 0.09 | ○ |
| | 7 | Δ | Δ | Δ | Δ | Δ | 0.10 | 0.17 | X |
| | 8 | Δ | ○ | ○ | ○ | ○ | 0.11 | 0.16 | X |
| | 9 | ○ | Δ | ○ | ○ | Δ | 0.06 | 0.09 | ○ |

*as a Ti atom
**as a phosphate radical

TABLE 7

Hot-dip galvanized steel sheet

| | | Compositions of coat (mass ratio) | | | | | | | | |
|---|---|---|---|---|---|---|---|---|---|---|
| | | A-1 | | A-2 | | A-3 | | A-4 | | B | |
| | | Species | Quantity | Species | Quantity | Species | Quantity | Species | Quantity* | Species | Quantity |
| Examples | 7 | Production Example 1 | 80 | Production Example 5 | 20 | a | 30 | b | 0.8 | c | 3 |
| | 8 | Production Example 1 | 70 | Production Example 5 | 30 | a | 30 | b | 0.8 | c | 3 |
| | 9 | Production Example 3 | 70 | Production Example 5 | 30 | a | 35 | b | 0.4 | d | 3 |
| | 10 | Production Example 1 | 50 | Production Example 4 | 50 | a | 35 | b | 0.4 | d | 1.5 |
| | 11 | Production Example 1 | 50 | Production Example 4 | 50 | a | 25 | b | 0.8 | c | 3 |
| | 12 | Production Example 1 | 30 | Production Example 4 | 70 | a | 30 | b | 0.8 | c | 3 |
| Compar. Examples | 10 | Production Example 1 | 100 | — | | a | 30 | b | 0.8 | c | 3 |
| | 11 | | — | Production Example 5 | 100 | a | 25 | b | 0.8 | c | 3 |
| | 12 | Production Example 2 | 50 | Production Example 4 | 50 | a | 35 | b | 0.4 | d | 1.5 |
| | 13 | Production Example 1 | 30 | Production Example 6 | 70 | a | 30 | b | 0.8 | c | 3 |
| | 14 | Production Example 1 | 70 | Production Example 5 | 30 | a | 35 | b | 0.4 | | — |
| | 15 | Production Example 1 | 50 | Production Example 4 | 50 | a | 35 | b | 0.4 | e | 7.5 |
| | 16 | Production Example 1 | 50 | Production Example 4 | 50 | a | 25 | b | 0.8 | f | 7.5 |
| | 17 | Production Example 1 | 70 | Production Example 5 | 30 | a | 30 | b | 0.8 | g | 4.5 |
| | 18 | Production Example 3 | 70 | Production Example 5 | 30 | a | 35 | b | 0.4 | d | 3 |

| | | Compositions of coat (mass ratio) | | | | | | Performance of coat | | |
|---|---|---|---|---|---|---|---|---|---|---|
| | | C | | D | | | | Adhesion property to substrate | Tape peeling resistance | Adhesion property to paint |
| | | Species | Quantity | Species | Quantity** | Species | Quantity | | | |
| Examples | 7 | h | 10 | j | 0.7 | k | 3.6 | ○ | ○ | ○ |
| | 8 | h | 5 | j | 1.2 | m | 1.3 | ○ | ○ | ○ |
| | 9 | h | 5 | j | 0.7 | n | 1.3 | ○ | ○ | ○ |
| | 10 | h | 5 | j | 0.7 | l | 1.3 | ○ | ○ | ○ |
| | 11 | h | 10 | j | 1.2 | m | 1.3 | ○ | ○ | ○ |
| | 12 | h | 1 | j | 0.7 | o | 1.3 | ○ | ○ | ○ |
| Compar. Examples | 10 | h | 10 | j | 0.7 | k | 3.6 | Δ | ○ | ○ |
| | 11 | h | 10 | j | 1.2 | m | 1.3 | Δ | X | ○ |
| | 12 | h | 5 | j | 0.7 | l | 1.3 | ○ | Δ | ○ |
| | 13 | h | 1 | j | 0.7 | o | 1.3 | Δ | Δ | Δ |
| | 14 | | — | j | 0.7 | n | 1.3 | ○ | ○ | ○ |
| | 15 | | — | j | 0.7 | l | 1.3 | ○ | ○ | Δ |
| | 16 | h | 10 | j | 1.2 | m | 1.3 | ○ | ○ | ○ |
| | 17 | h | 5 | j | 1.2 | m | 1.3 | ○ | ○ | ○ |
| | 18 | i | 5 | j | 0.7 | n | 1.3 | ○ | Δ | ○ |

| | | Performance of coat | | | | | | | |
|---|---|---|---|---|---|---|---|---|---|
| | | Corrosion resistance of processed portion | Solvent resistance | | | Alkali resistance | Coefficient of kinetic friction | Coefficient of static friction | Abrasion resistance |
| | | | Ethanol | MEK | White gasoline | | | | |
| Examples | 7 | ○ | ○ | ○ | ○ | ○ | 0.07 | 0.14 | ○ |
| | 8 | ○ | ○ | ○ | ○ | ○ | 0.06 | 0.12 | ○ |
| | 9 | ○ | Δ | ○ | ○ | Δ | 0.07 | 0.15 | ○ |
| | 10 | ○ | ○ | ○ | ○ | ○ | 0.09 | 0.17 | ○ |
| | 11 | ○ | ○ | ○ | ○ | ○ | 0.06 | 0.13 | ○ |
| | 12 | ○ | ○ | ○ | ○ | ○ | 0.06 | 0.12 | ○ |

TABLE 7-continued

Hot-dip galvanized steel sheet

| | | | | | | | | | |
|---|---|---|---|---|---|---|---|---|---|
| Compar. Examples | 10 | X | △ | ○ | ○ | △ | 0.08 | 0.12 | △ |
| | 11 | ○ | ○ | ○ | △ | ○ | 0.08 | 0.17 | ○ |
| | 12 | △ | X | X | ○ | X | 0.08 | 0.16 | △ |
| | 13 | △ | ○ | ○ | △ | △ | 0.08 | 0.13 | △ |
| | 14 | ○ | ○ | ○ | ○ | ○ | 0.12 | 0.25 | X |
| | 15 | ○ | ○ | ○ | ○ | ○ | 0.06 | 0.09 | ○ |
| | 16 | △ | △ | △ | △ | △ | 0.10 | 0.17 | X |
| | 17 | △ | ○ | ○ | ○ | ○ | 0.11 | 0.16 | X |
| | 18 | ○ | △ | ○ | ○ | △ | 0.06 | 0.09 | ○ |

*as a Ti atom
**as a phosphate radical

From the results of the above Tables 6 and 7, it is evident that the coated steel sheet of the present invention has the excellent properties in abrasion resistance in addition to an adhesion property to a substrate, tape peeling resistance, an adhesion property to a paint, corrosion resistance of a processed portion, solvent resistance and alkali resistance.

INDUSTRIAL APPLICABILITY

The coated steel sheet of the present invention can be suitably used for automobiles, household electrical appliances, and construction materials.

The invention claimed is:

1. A coated steel sheet coated with a composite coat, wherein said composite coat comprises
   a compounded resin (A) in which polyurethane resin particles (A-1), ethylene-unsaturated carboxylic acid copolymerization resin particles (A-2), silicon oxide particles (A-3) having an average particle diameter of 5 to 20 nm and an organic titanium compound (A-4) are compounded, wherein the polyurethane resin particles (A-1) and ethylene-unsaturated carboxylic acid copolymerization resin particles (A-2) have an average particle diameter of 20 to 100 nm, are used in a mass ratio of 20:80 to 90:10 with respect to each other, and both contain a silanol group and/or an alkoxysilyl group;
   polyolefin wax particles (B) having an average particle diameter of 0.5 to 4 µm and a softening point of 100 to 140° C.; and
   silicon oxide particles (B) having an average particle diameter of 70 to 200 nm, and
   wherein an amount of a coat of said composite coat is 0.5 to 3 g/m².

2. The coated steel sheet according to claim 1, wherein, in the composite coat, an amount of the silicon oxide particles (A-3) is 5 to 100% by mass with respect to the total amount of the polyurethane resin particle (A-1) and the ethylene-unsaturated carboxylic acid copolymerization resin particles (A-2) and the content of a titanium atom is 0.05 to 3% by mass with respect to the total amount of the coat.

3. The coated steel sheet according to claim 2, wherein the composite coat is a coat formed by further compounding at least one rust preventive agent (D) selected from the group consisting of phosphate compounds, thiocarbonyl compounds, niobium oxide and guanidine compounds in addition to the substances (A), (B) and (C).

4. The coated steel sheet according to claim 2, wherein the polyurethane resin particles (A-1) have a polycarbonate group and the ethylene-unsaturated carboxylic acid copolymerization resin particles (A-2) are made from a derivative of a neutralized product of an ethylene-methacrylic acid copolymerization resin with alkali metal, ammonia and/or amine.

5. The coated steel sheet according to claim 1, wherein the composite coat is a coat formed by further compounding at least one rust preventive agent (D) selected from the group consisting of phosphate compounds, thiocarbonyl compounds, niobium oxide and guanidine compounds in addition to the substances (A), (B) and (C).

6. The coated steel sheet according to claim 5, wherein the polyurethane resin particles (A-1) have a polycarbonate group and the ethylene-unsaturated carboxylic acid copolymerization resin particles (A-2) are made from a derivative of a neutralized product of an ethylene-methacrylic acid copolymerization resin with alkali metal, ammonia and/or amine.

7. The coated steel sheet according to claim 1, wherein the polyurethane resin particles (A-1) have a polycarbonate group and the ethylene-unsaturated carboxylic acid copolymerization resin particles (A-2) are made from a derivative of a neutralized product of an ethylene-methacrylic acid copolymerization resin with alkali metal, ammonia and/or amine.

* * * * *